United States Patent [19]

Kosak et al.

[11] Patent Number: 4,471,974

[45] Date of Patent: Sep. 18, 1984

[54] INDIVIDUAL WHEEL SUSPENSION FOR NON-STEERED WHEELS OF MOTOR VEHICLES, ESPECIALLY AUTOMOBILES

[75] Inventors: Werner Kosak, Dachau; Axel Pauly, Munich, both of Fed. Rep. of Germany

[73] Assignee: Bayerische Motoren Werke AG, Fed. Rep. of Germany

[21] Appl. No.: 388,217

[22] Filed: Jun. 14, 1982

Related U.S. Application Data

[63] Continuation-in-part of Ser. No. 321,605, Nov. 16, 1981, abandoned.

[30] Foreign Application Priority Data

Nov. 14, 1980 [DE] Fed. Rep. of Germany ..... 80107071

[51] Int. Cl.$^3$ ............................................... B60G 3/00
[52] U.S. Cl. .................................. 280/690; 280/701
[58] Field of Search ............... 280/690, 671, 675, 701, 280/673

[56] References Cited

U.S. PATENT DOCUMENTS

| | | | |
|---|---|---|---|
| 3,163,440 | 12/1964 | Vail | 280/690 |
| 3,229,783 | 1/1966 | Muller | 280/690 |
| 3,368,824 | 2/1968 | Julien | 280/701 |
| 4,132,430 | 1/1979 | Bantle | 280/673 |

FOREIGN PATENT DOCUMENTS 698921 12/1965 Italy ..................................... 280/701

*Primary Examiner*—Richard A. Bertsch

*Attorney, Agent, or Firm*—Craig & Burns

[57] ABSTRACT

An individual wheel suspension for a non-steered wheel of a motor vehicle such as an automobile comprises a trailing arm including a lengthwise arm directed along the length of the vehicle, the trailing arm being articulated to the vehicle body by means of the lengthwise arm as well as two wishbones which are arranged transversely to the length of the vehicle and are located one above the other wherein at least the articulation of the lengthwise arm is an elastic bearing. The suspension is characterized in that the articulation of the lengthwise arm is disposed in the vicinity of the wheel center plane with the articulations of the wishbones on the body side being on one side of the wheel axle as viewed from above, and in that the articulations of the wishbones on the wheel side as viewed from above lie approximately on an auxiliary tie rod which runs centrally through the articulations of the wishbone on the body side and at least approximately through the intersection of the application lines of the force along the wheel and laterally with respect to the wheel. Wherein, the articulation of the lengthwise arm to the vehicle body is an elastic bearing with different spring rates $C_1$ and $C_2$ in directions which are approximately horizontal and approximately perpendicular with respect to one another, and wherein the direction of the first spring rate $C_1$ is primarily transverse to the length of the vehicle and forms an angle which is different than 90° with the force which results and acts upon the elastic bearing as viewed from above.

11 Claims, 6 Drawing Figures

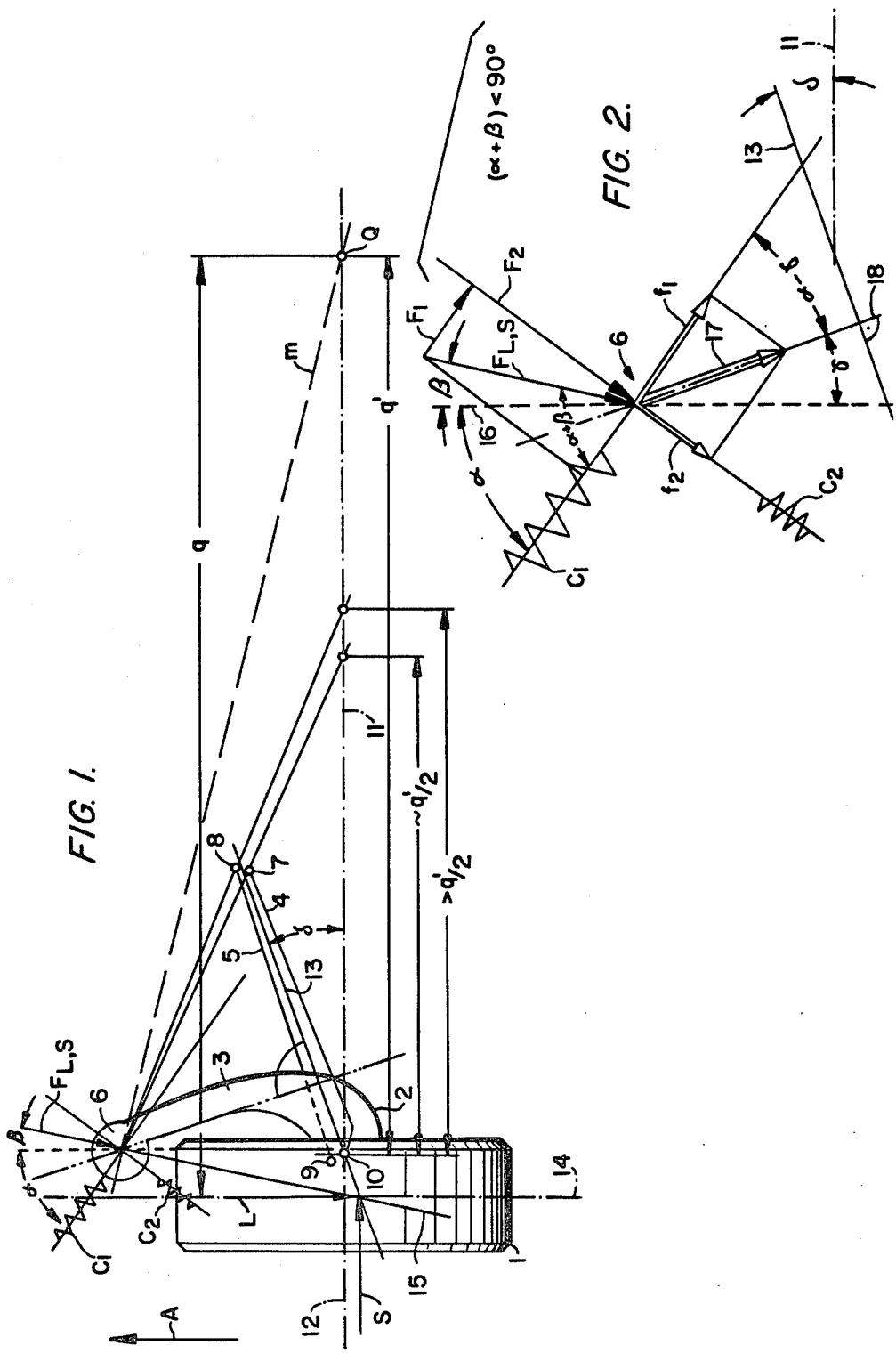

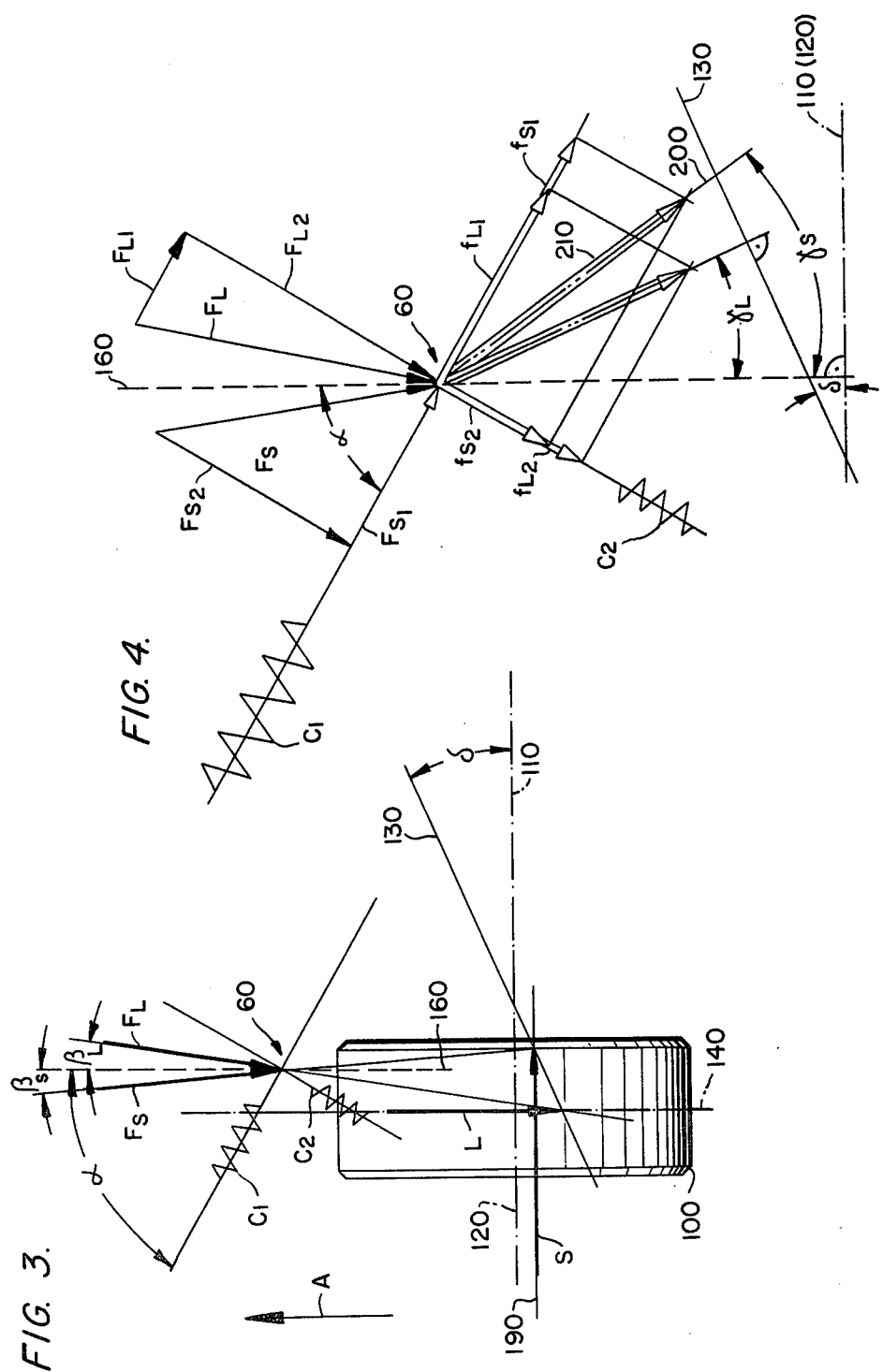

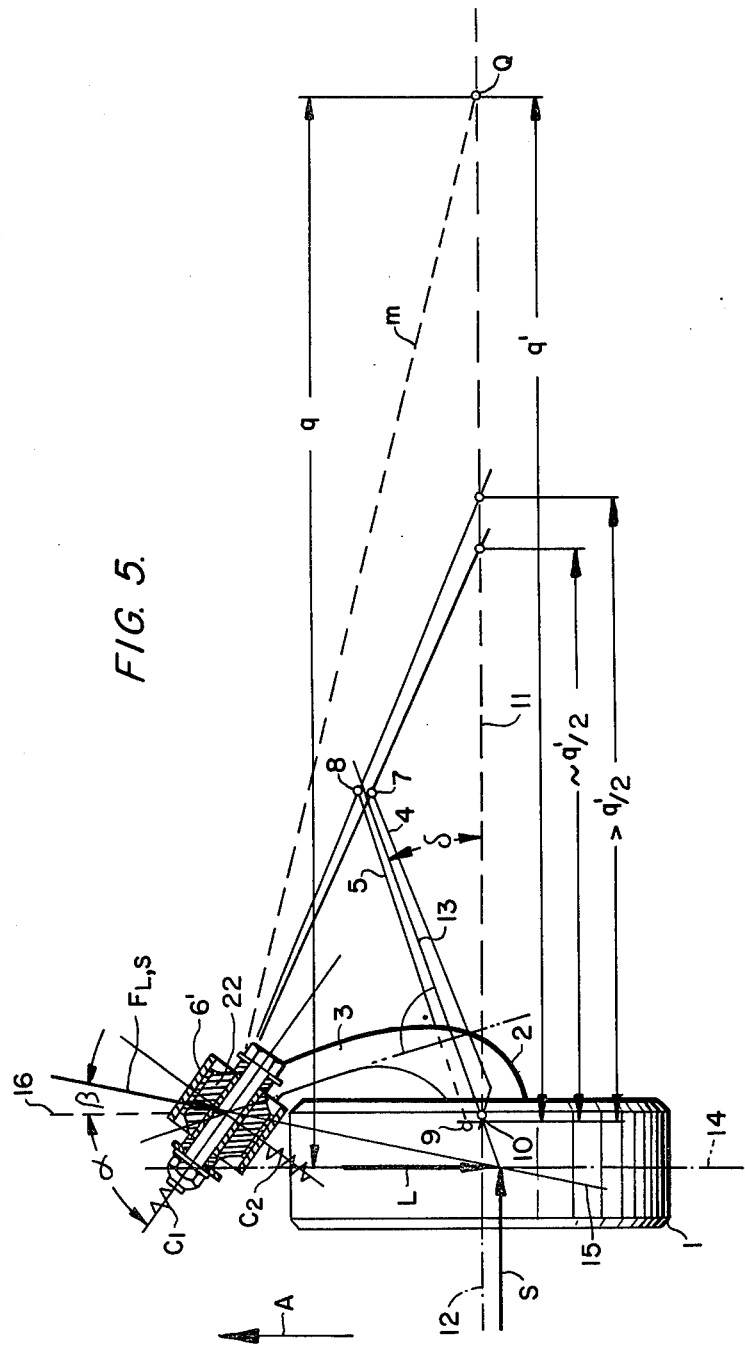

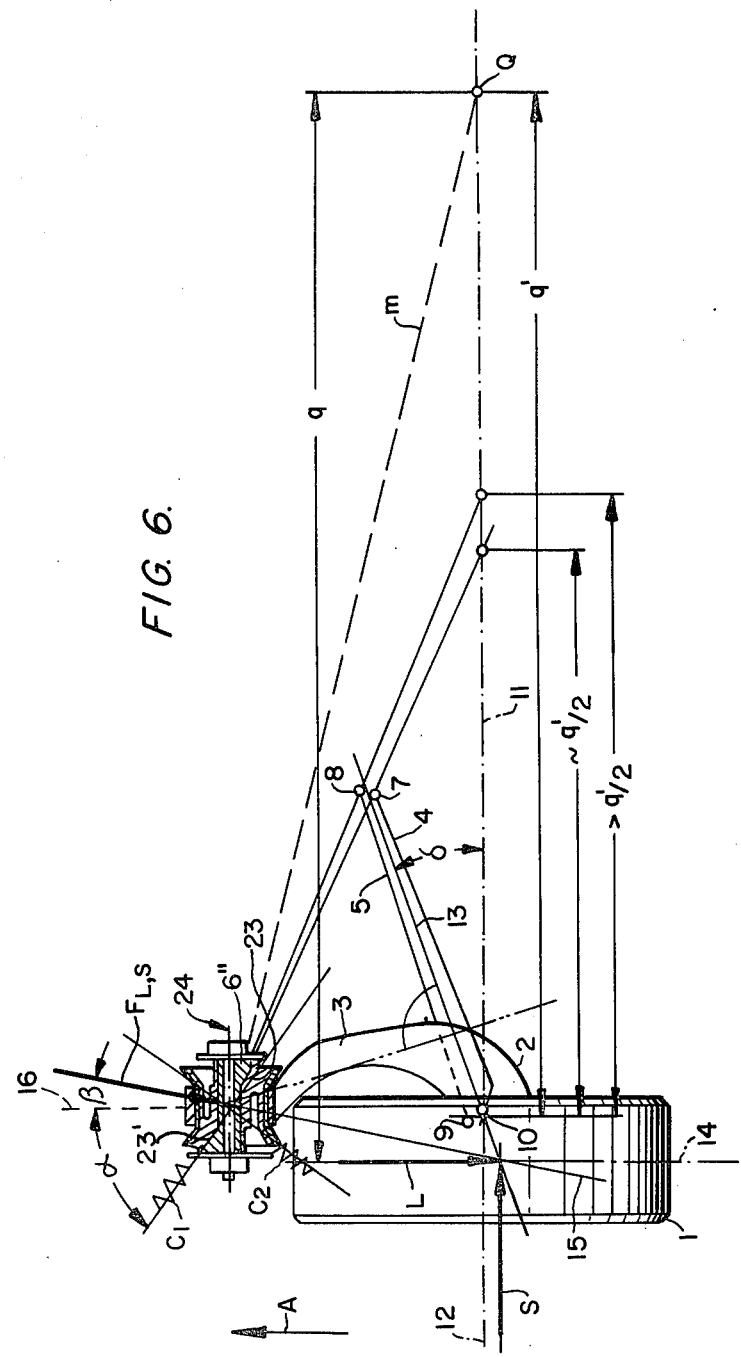

{ 4,471,974 }

INDIVIDUAL WHEEL SUSPENSION FOR NON-STEERED WHEELS OF MOTOR VEHICLES, ESPECIALLY AUTOMOBILES

CROSS REFERENCE TO RELATED INVENTION

This application is a continuation-in-part of applicants' earlier co-pending application Ser. No. 321,605, filed Nov. 16, 1981 now abandoned.

FIELD OF THE INVENTION

The present invention relates to an individual wheel suspension for non-steered wheels of a motor vehicle, such as an automobile comprising a trailing arm which includes a lengthwise arm directed along the length of the vehicle and which is articulated to the vehicle body by means of the lengthwise arm as well as two wishbones which are arranged transversely to the length of the vehicle and are located one above the other, wherein at least the articulation of the lengthwise arm is an elastic bearing.

BACKGROUND AND SUMMARY OF THE INVENTION

In an individual wheel suspension of this type, a disadvantageous toe-in behavior can occur merely as the result of the lengthwise elastic arrangement of the trailing arm-lengthwise arm on the vehicle body due to longitudinal and/or circumferential forces as well as lateral forces on the wheel.

An object of the invention is to improve an individual wheel suspension of the aforementioned type such that elastic lengthwise springing, desired for comfort reasons, is achieved without undesired toe-in behavior.

This and other objects of the invention are achieved by providing in an individual wheel suspension of the aforementioned type that the articulation of the lengthwise arm is disposed in the vicinity of the wheel center plane with the articulations of the wishbones on the body side being on one side of the wheel axle as viewed from above, and in that the articulations of the wishbones on the wheel side as viewed from above lie approximately on an auxiliary tie rod which runs centrally through the articulations of the wishbone on the body side and at least approximately through the intersection of the application lines of the forces along the wheel and laterally with respect to the wheel. The articulation of the lengthwise arm to the vehicle body is an elastic bearing with different spring rates $C_1$ and $C_2$ in directions which are approximately horizontal and approximately perpendicular with respect to one another, and wherein the direction of the first spring rate $C_1$ is primarily at right angles to the length of the vehicle and forms an angle which is not 90° with the force which results and acts upon the elastic bearing as viewed from above.

The invention produces an individual wheel suspension with the advantage of achieving desired toe-in behavior through elastic lengthwise springing produced by lengthwise and/or lateral forces.

The arrangement of the articulations of the wishbones and lengthwise-arm articulations according to the invention, as well as their design as elastic bearings with spring rates directed in different directions, on the one hand, and the adjustment of the force resulting from the lengthwise and/or lateral force on the arm articulation to the spring rate $C_1$, acting primarily in the direction transverse to the vehicle, on the other hand, can be established with the angles and spring-travel ratio as set forth hereinafter for the lengthwise-elastically sprung wheel of the individual wheel suspension, whether the wheel goes into toe-in with lengthwise springing as a result of the longitudinal force (braking, accelerating) and/or lateral force (going around a curve), or the predetermined toe-in is retained, or the toe-in is reduced.

In particular, the ratio for the spring rates $C_1$ and $C_2$ are determined as a function of an adjustment angle $\alpha$ between the direction of said first spring rate $C_1$ and a reference line in the direction lengthwise with respect to the vehicle, a directional angle $\beta$ between the reference lines and the resultant force where $\alpha + \beta$ is less than 90°, and a migration angle $\gamma$ between the reference line and one direction of migration of the lengthwise arm in the elastic bearing according to:

$$C_2/C_1 \tan(\alpha+\beta)/\tan(\alpha-\gamma).$$

In a disclosed embodiment of the invention, the lengthwise arm is directed forward in the direction of the length of the vehicle, and the wishbones with their auxiliary tie rods, as viewed from above intersect at least approximately at the intersection of the force acting lengthwise to the wheel and the lateral force, and form an angle $\delta$ with the wheel axis which has a value which is determined in accordance with the migration angle $\gamma$ of the lengthwise arm with $\gamma$ being less than or equal to $\delta$. With this arrangement and a tuning of the spring rates $C_1, C_2$ as a function of the different angles, the articulation point of the lengthwise arm undergoes a displacement at right angles to the direction of the auxiliary tie rods of the wishbones both under load caused by longitudinal forces and/or lateral forces as a consequence of the resulting force on the bearing. In this way, the total trailing arm advantageously undergoes a translation without a change in toe-in of the wheel and without an undesired steering movement.

According to a further feature of the invention, the wishbones with their auxiliary tie rods, as viewed from above, form an angle $\delta$ with the axis of the wheel which is smaller than the migration angle $\gamma$. As a result of this feature, a desired toe-in behavior is achieved in the toe-in direction during braking with both wheels of an axle and when rounding a curve in the wheel on the outside of the curve, and in the toe-out direction during drive by both wheels of an axle and when rounding a curve in the wheel on the inside of the curve.

In a second embodiment of the invention, wherein the lengthwise arm points forward in the direction of the length of the vehicle, the auxiliary tie rod centered with respect to the two wishbones, as viewed from above, intersects with the force acting lengthwise with respect to the wheel in the wheel center plane, in the direction of travel, behind the application line of the lateral force, whereby the migration angle $\gamma$ of the lengthwise arm with respect to the reference line under the influence of the force acting lengthwise upon the wheel, depending on the magnitude, can be selected to be larger than or equal to the angle $\delta$ between the wheel axle and/or a plane transverse to the vehicle and the auxiliary tie rod.

With such an individual wheel suspension, two resultant force directions, acting in different directions on the bearing of the lengthwise arm, result from the forces along the wheel and the lateral forces. This produces the advantage of a differentiated toe-in behavior in response to forces directed along the wheel and laterally of the wheels. In particular, if the ratio of spring rates $C_1$ and $C_2$ is chosen so that no change in toe-in occurs under lateral forces (the articulation point of the lengthwise arm moves at right angles to the direction of the auxiliary tie rods of the wishbones) a change in toe-in in the toe-in direction is feasible under the influence of lateral forces on the wheel. In this manner, for example, as regards favorable toe-in behavior, disadvantageous deformations of the elastic bearings in the articulations of the wishbones can be advantageously eliminated.

The mounting of the lengthwise arm according to the invention can be accomplished in simple fashion by using a rubber-elastic turn and slide spring.

An additional feature of the invention involves an individual wheel suspension with the lengthwise arm pointing forward in the direction running lengthwise of the vehicle. The lower wishbone, in a transverse plane running vertically through the wheel center, forms an auxiliary tie rod with a length that is approximately equal to or larger than half the value of an interval which is established from a transverse pole in the vicinity of the wheel center and the upper wishbone. The thus formed auxiliary tie rod, has length which is less than or equal to the lower auxiliary tie rod, whereby the articulation of the lengthwise arm on the vehicle body is chosen to be near the wheel center plane. In this manner an individual wheel suspension is achieved wherein the advantage of a favorable toe-in behavior with elastic lengthwise springing is combined with the advantage of a favorable toe-in behavior at the desired small change in camber as the spring extends and is compressed.

These and other objects, features and advantages of the present invention will become more apparent from the following description when taken in connection with the accompanying drawings, which show, for purposes of illustration only, two embodiments in accordance with the present invention.

BRIEF DESCRIPTION OF THE DRAWINGS

FIG. 1 shows in schematic form an individual wheel suspension according to the invention wherein the auxiliary tie rod of the wishbone articulations intersects at the junction of the forces directed along the wheel and the lateral force;

FIG. 2 shows the diagram of forces in the lengthwise arm articulation for a wheel suspension according to FIG. 1;

FIG. 3 shows a second embodiment of an individual wheel suspension of the invention wherein the auxiliary tie rod of the wishbone articulations intersects the force along the wheel behind the line of application of the lateral force, which is located forward in the direction of travel;

FIG. 4 shows the diagram of forces in the lengthwise arm articulation for a wheel suspension according to FIG. 3;

FIG. 5 illustrates a first rubber-metal element for the pivoting of the longitudinal arm at the vehicle body; and FIG. 6 shows a second rubber-metal element for the pivoting of the longitudinal arm.

DETAILED DESCRIPTION OF THE INVENTION

A wheel 1 of an individual wheel suspension for non-steered wheels of an automobile, not shown, is connected with a trailing arm 2, the arm comprises a lengthwise arm 3 directed forward in a direction lengthwise of the vehicle along arrow "A" and is connected in an articulated fashion with the vehicle body by lengthwise arm 3 as well as two wishbones 4 and 5. The wishbones are disposed generally transversely to the lengthwise direction of the vehicle and are disposed one above the other. Lengthwise arm 3 is connected by an articulation 6 with the vehicle body, while wishbones 4 and 5 are articulated to the vehicle body via articulations 7 and 8. Wishbones 4 and 5 are connected to trailing arm 2 at the wheel by articulations 9 and 10.

Articulations 9 and 10 on the wheel side, in the individual wheel suspension shown in the top view, are located in the vicinity of a transverse plane above or below wheel axis 12. The plane passes through the center of the wheel and is symbolized by line 11.

As FIG. 1 indicates, articulation 6 of the lengthwise arm 3 as well as the articulations 7 and 8 of wishbones 4 and 5 at the body are disposed in the lengthwise direction of the vehicle along arrow "A", ahead of axle 12 or transverse plane 11. Consequently, an auxiliary tie rod 13, centrally located by articulations 7 and 8 on the body side and articulations 9 and 10 at the wheel forms an angle $\delta$ with transverse plane 11. Angle $\delta$ is chosen so that the auxiliary tie rod 13 at the wheel meets wheel center plane 14 at the intersection of the lengthwise force L on the wheel and the lateral force S on the wheel. A line of application 15 runs through articulation 6 from this intersection, along which a force F, a resultant of longitudinal force L and/or lateral force S, acts upon articulation 6. Articulation 6 is designed as an elastic bearing with differential spring rates $C_1$ and $C_2$ in directions which are approximately horizontal and approximately perpendicular to one another.

If an angle of adjustment $\alpha$ is chosen between the direction of spring travel $C_1$ and a reference line 16 running lengthwise with respect to the vehicle through the intersection of the spring directions and directional angle $\beta$ is chosen between reference line 16 and the resultant force $F_{L,S}$, in such fashion that the total of $\alpha$ and $\beta$ is less than 90°, the resultant force $F_{L,S}$ at the point of articulation of lengthwise arm 3 in bearing and/or articulation 6 will produce a defection $f_1$ and $f_2$. If the spring travel ratio $C_2/C_1$ is chosen appropriately, the two deflections will produce a displacement of the articulation point of lengthwise arm 3 in articulation 6 as shown by the arrow 17 along line 18, whereby both wishbones 4 and 5 swivel about their articulations 7 and 8 at the body.

It is also apparent from FIG. 2 that line 18 forms a shift angle $\gamma$ with reference line 16. If this angle $\gamma$, depending on its value, is chosen to be equal to the angle $\delta$ between the auxiliary tie rods 13 through the articulations of wishbones 4 and 5 and transverse plane 11 and/or axle 12, trailing arm 2 and consequently wheel 1 will undergo a translational movement without a change in the predetermined toe-in. Changes in toe-in on wheel 1, on the other hand, are produced with an elastic lengthwise springing of wheel 1 caused by longitudinal force L or lateral force S, with a shift angle $\gamma$ which is chosen to be different from angle $\delta$, whereby when $\gamma$ is greater than $\delta$ wheel 1 also goes into toe-in.

The values for spring travel rates $C_1$ and $C_2$ are determined from the spring travel ratio $C_2/C_1$ obtained from the following expressions: $F_1 = F \times \cos(\alpha+\beta)$; $F_2 = F \times \sin(\alpha+\beta)$ and $f_1 = f_1/C_1$; $f_2 = F_2/C_2$ via equation $f_2/f_1 = \tan(\alpha-\gamma)$ which gives: $C_2/C_1 = \tan(\alpha+\beta)/\tan(\alpha-\gamma)$.

The individual wheel suspension shown in FIG. 1 is a spherical wheel suspension. Lower wishbone 5 forms an auxiliary tie rod in transverse plane 11, having a length slightly larger than half the value of a distance q', which transverse pole Q from articulations 9, 10 of wishbone 4 and 5 has on the wheel side. Upper wishbone 4 forms an auxiliary tie rod whose length is less than that of the lower auxiliary tie rod, namely approximately q'/2. As a result, in addition to a favorable toe-in behavior with elastic longitudinal springing of wheel 1, favorable toe-in behavior is simultaneously achieved with a desirably small change in camber for wheel 1 as the spring is compressed and extended.

In the individual wheel suspension shown in FIG. 3, which is similar to the design shown in FIG. 1, the auxiliary tie rod 130 of the wishbones, not shown, intersects with the force L acting lengthwise with respect to the wheel in the wheel center plane 140 behind the application line 190, located forward in the direction of travel (arrow "A"), of lateral force S. As a result, there are two resultant forces, $F_L$ and $F_S$, acting in different directions upon the bearing of the longitudinal arm.

It follows from FIG. 4 that the shift angle $\gamma_L$, under force L longitudinal with respect to the wheel, depending on its magnitude, is equal to the angle $\delta$ between the auxiliary tie rods 130 and transverse plane 110 or axle 120. Thus, there is no change in toe-in wheel 100 under the influence of longitudinal force L, since the trailing arm and/or wheel 100 undergoes a translational elastic longitudinal springing.

On the other hand, with lateral force S applied at the wheel through $F_S$ according to FIG. 4, there is a migration of the articulation point of the longitudinal arm and/or trailing arm along the line 200 as shown by arrow 210, whereby the migration angle $\gamma_S$ is larger than $\gamma_L$. Thus, there is a change in toe-in for wheel 100 in the toe-in direction.

Articulation 6 of the individual wheel suspension according to the invention can be designed as a rubber-elastic turn and slide spring 6', as shown in FIG. 5. Here a rubber ring 22, closed in the circumferential direction, can be provided between one inner and one outer rigid sleeve. It is known that a turn and slide bearing 6' of this type can be made softer in the axial direction than in the radial direction. Hence, to achieve the effect according to the invention, the turn and slide bearing 6', with the direction of axial spring rate $C_1$, by means of which the greater spring travel is achieved, is disposed at an angle $\alpha$ to reference line 16.

Another embodiment of articulation 6 according to FIG. 1 is illustrated with a rubber-metal element 6" in FIG. 6. Rubber-metal element 6" has at each end rubber inserts 23, 23' disposed between semi-circular conical stops, whereby the stops and the rubber inserts 23, 23' are staggered at 180° to one another. This produces effective directions of spring travel rates $C_1, C_2$ which are at a sharp angle to axis 24 of element 6". Once again, the longer spring travel is achieved through the greater softness of the spring by means of spring rate $C_1$. By dimensioning the conical stops as well as the rubber inserts 23,23', an inclined position of the direction of spring rate $C_1$ can be achieved, which corresponds to the adjustment angle $\alpha$ to reference line 16, with axis 24 of the rubber-metal element 6" located cross-wise. Of course, the rubber-metal element 6" can also be mounted at an angle and yet achieve the effect according to the invention.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. An individual wheel suspension for a non-steered wheel of a motor vehicle, such as an automobile, comprising a trailing arm which includes a lengthwise arm disposed generally in the direction of the length of the vehicle, said trailing arm being articulated to the vehicle body by articulating means at one end of the lengthwise arm and by two wishbones arranged generally transversely to the length of the vehicle and located generally one above the other, wherein said articulation means of the lengthwise arm includes an elastic bearing means disposed in the vicinity of the wheel center plane for allowing elastic lengthwise springing, articulation means for said wishbones on the body side being on one side of the wheel axle as viewed from above, articulation means for said wishbones on the wheel side, as viewed from above, lying generally along an auxiliary tie rod which runs centrally through the articulation means of the wishbones on the body side and at least approximately through the intersection of the application lines of the forces along the wheel and laterally with respect to the wheel, wherein the elastic bearing means has different spring rates $C_1$ and $C_2$ in directions which are substantially horizontal and generally perpendicular with respect to one another, and wherein the direction of the first spring rate $C_1$, is generally transverse to the direction of the length of the vehicle and forms an angle unequal to 90° relative to direction of the force which results and acts upon the elastic bearing means as viewed from above.

2. An individual wheel suspension according to claim 1, characterized in that the ratio for the spring rates $C_1$ and $C_2$ are determined as a function of an adjustment angle $\alpha$ between the direction of said first spring rate $C_1$ and a reference line in the direction lengthwise with respect to the vehicle, a directional angle $\beta$ between the reference lines and the resultant force where $\alpha+\beta$ is less than 90°, and a migration angle $\gamma$ between the reference line and one direction of migration of the lengthwise arm in the elastic bearing is according to:

$$C_2/C_1 \tan(\alpha+\beta)/\tan(\alpha-\gamma).$$

3. An individual wheel suspension according to claim 2, characterized in that the lengthwise arm is directed forward in the direction of the length of the vehicle and in that both wishbones with their auxiliary tie rods, as viewed from above intersect at least approximately at the intersection of the force acting lengthwise to the wheel and the lateral force, and form an angle $\delta$ with the wheel axis, said angle having a value which is determined in accordance with the migration angle $\gamma$ of the lengthwise arm with $\gamma$ being less than or equal to $\delta$.

4. An individual wheel suspension according to claim 3, characterized in that the wishbones with their auxiliary tie rods, as viewed from above form an angle with the axis of the wheel which is smaller than the migration angle $\gamma$.

5. An individual wheel suspension according to claim 2, characterized in that the lengthwise arm points forward in the direction of the length of the vehicle, and in that the auxiliary tie rod centered with respect to the two wishbones, as viewed from above, intersects with the force acting lengthwise with respect to the wheel in the wheel center plane, in the direction of travel, behind the application line of the lateral force whereby the migration angle $\gamma$ of the lengthwise arm with respect to the reference line under the influence of the force acting lengthwise upon the wheel, depending on the magnitude, can be selected to be larger than or equal to the angle $\delta$ between the wheel axle and/or a plane transverse to said vehicle plane and the auxiliary tie rod.

6. An individual wheel suspension according to claim 1, characterized in that the lengthwise arm is directed forward in the direction of the length of the vehicle, and in that both wishbones with their auxiliary tie rods, as viewed from above, intersect at least approximately at the intersection of the force acting lengthwise to the wheel (L) and the lateral force, and form an angle $\delta$ with the wheel axis, said angle having a value which is determined in accordance with the migration angle $\gamma$ of the lengthwise arm with $\gamma$ being less than or equal to $\delta$.

7. An individual wheel suspension according to claim 6, characterized in that the wishbones with their auxiliary tie rods, as viewed from above form an angle $\delta$ with the axis of the wheel which is smaller than the migration angle $\gamma$.

8. An individual wheel suspension according to claim 1, characterized in that the lengthwise arm points forward in the direction of the length of the vehicle, and in that the auxiliary tie rod centered with respect to the two wishbones, as viewed from above, intersects with the force acting lengthwise with respect to the wheel in the wheel center plane, in the direction of travel, behind the application line of the lateral force whereby the migration angle $\gamma$ of the lengthwise arm with respect to the reference line under the influence of the force acting lengthwise upon the wheel, depending on the magnitude, can be selected to be larger than or equal to the angle $\delta$ between the wheel axle and/or a plane transverse to said vehicle plane and the auxiliary tie rod.

9. An individual wheel suspension according to claims 1, 2, 3, 4, 5, 6, 7 or 8, characterized in that said bearing is a rubber-elastic turn and slide spring.

10. An individual wheel suspension according to claim 9, characterized in that the lengthwise arm points forward in the direction running lengthwise of the vehicle, and in that the lower wishbone, in a transverse plane running vertically through the wheel center, forms an auxiliary tie rod with a length that is approximately equal to or larger than half the value of an interval which is established from a transverse pole in the vicinity of the wheel center and the upper wishbone forms an auxiliary tie rod whose length is less than or equal to the lower auxiliary tie rod, whereby the articulation of the lengthwise arm on the vehicle body is chosen to be near the wheel center plane.

11. An individual wheel suspension according to claims 1, 2, 3, 4, 5, 6, 7 or 8, characterized in that the lengthwise arm points forward in the direction running lengthwise of the vehicle, and in that the lower wishbone, in a transverse plane running vertically through the wheel center, forms an auxiliary tie rod with a length that is approximately equal to or larger than half the value of an interval which is established from a transverse pole in the vicinity of the wheel center and the upper wishbone forms an auxiliary tie rod whose length is less than or equal to the lower auxiliary tie rod, whereby the articulation of the lengthwise arm on the vehicle body is chosen to be near the wheel center plane.

* * * * *